US012803118B2

(12) United States Patent
Lee et al.

(10) Patent No.: US 12,803,118 B2
(45) Date of Patent: Nov. 17, 2026

(54) SECONDARY BATTERY

(71) Applicant: SAMSUNG SDI CO., LTD., Yongin-si (KR)

(72) Inventors: Hyun Soo Lee, Yongin-si (KR); Jun Sun Yong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 433 days.

(21) Appl. No.: 17/931,851

(22) Filed: Sep. 13, 2022

(65) Prior Publication Data

US 2023/0238657 A1 Jul. 27, 2023

(30) Foreign Application Priority Data

Jan. 24, 2022 (KR) ........................ 10-2022-0009999

(51) Int. Cl.

| | |
|---|---|
| ***H01M 50/477*** | (2021.01) |
| ***H01M 50/103*** | (2021.01) |
| ***H01M 50/15*** | (2021.01) |
| ***H01M 50/474*** | (2021.01) |
| ***H01M 50/531*** | (2021.01) |
| ***H01M 50/548*** | (2021.01) |

(Continued)

(52) U.S. Cl.
CPC ....... *H01M 50/477* (2021.01); *H01M 50/103* (2021.01); *H01M 50/15* (2021.01); *H01M 50/474* (2021.01); *H01M 50/531* (2021.01); *H01M 50/548* (2021.01); *H01M 50/586* (2021.01); *H01M 50/593* (2021.01)

(58) Field of Classification Search
CPC ............. H01M 50/477; H01M 50/474; H01M 50/548; H01M 50/103; H01M 50/15
See application file for complete search history.

(56) References Cited

U.S. PATENT DOCUMENTS

| | | | |
|---|---|---|---|
| 2,903,496 | A | 9/1959 | Hans |
| 9,570,720 | B2 | 2/2017 | Byun |
| 2011/0081573 | A1 | 4/2011 | Kim et al. |

(Continued)

FOREIGN PATENT DOCUMENTS

| | | |
|---|---|---|
| CN | 202352793 U | 7/2012 |
| CN | 202905821 U | 4/2013 |

(Continued)

OTHER PUBLICATIONS

Machine translation of KR20110037866 (Year: 2024).*

(Continued)

*Primary Examiner* — Brian R Ohara
*Assistant Examiner* — M. T. Leonard
(74) *Attorney, Agent, or Firm* — Womble Bond Dickinson (US) LLP

(57) ABSTRACT

A secondary battery includes: an electrode assembly including a negative electrode tab at a first end and a positive electrode tab at a second end; a case including a pair of first side portions facing each of a pair of long side portions of the electrode assembly, and a pair of second side portions facing each of a pair of short side portions of the electrode assembly, the case being open in directions of the negative electrode tab and the positive electrode tab; and a retainer between at least one of the second side portions and the electrode assembly and including a concave-convex structure.

10 Claims, 5 Drawing Sheets

(51) Int. Cl.
*H01M 50/586* (2021.01)
*H01M 50/593* (2021.01)

(56) References Cited

U.S. PATENT DOCUMENTS

| | | | | |
|---|---|---|---|---|
| 2011/0200872 | A1 | 8/2011 | Kogure | |
| 2011/0236750 | A1* | 9/2011 | Kohno | H01M 50/474 429/181 |
| 2011/0250491 | A1* | 10/2011 | Kim | H01M 50/579 429/176 |
| 2012/0114994 | A1 | 5/2012 | Kurahashi | |
| 2012/0171537 | A1 | 7/2012 | Sakai et al. | |
| 2013/0078503 | A1 | 3/2013 | Km | |
| 2015/0311482 | A1 | 10/2015 | Byun | |
| 2019/0198908 | A1* | 6/2019 | Lee | H01M 50/474 |
| 2020/0251767 | A1 | 8/2020 | Harrison et al. | |
| 2021/0074963 | A1* | 3/2021 | Zhang | H01M 50/533 |

FOREIGN PATENT DOCUMENTS

| | | | | | |
|---|---|---|---|---|---|
| EP | 2 747 185 | A1 | | 6/2014 | |
| GB | 796410 | A | | 6/1958 | |
| JP | 9-120836 | A | | 5/1997 | |
| JP | 2011-165565 | A | | 8/2011 | |
| JP | 2018-85215 | A | | 5/2018 | |
| JP | 2020-140874 | A | | 9/2020 | |
| KR | 1999-0066182 | A | | 8/1999 | |
| KR | 100274885 | B1 | * | 12/2000 | H01M 50/636 |
| KR | 20110037866 | A | * | 4/2011 | H01M 50/103 |
| KR | 10-2211526 | B1 | | 2/2021 | |
| WO | WO 2020/129128 | A1 | | 6/2020 | |
| WO | WO-2021168746 | A1 | * | 9/2021 | |

OTHER PUBLICATIONS

Machine translation WO2021168746A1 (Year: 2025).*
KR100274885B1 machine translation (Year: 2026).*
European Search Report dated Aug. 23, 2023, issued in corresponding European Patent Application No. 23151970.3 (7 pages).
Chinese Office Action corresponding to CN Application No. 202310034815.0, dated Dec. 31, 2025 (11 pages).

* cited by examiner

SECONDARY BATTERY

CROSS-REFERENCE TO RELATED APPLICATION

This application claims priority to and the benefit of Korean Patent Application No. 10-2022-0009999, filed on Jan. 24, 2022 in the Korean Intellectual Property Office, the entire content of which is herein incorporated by reference.

BACKGROUND

1. Field

Aspects of embodiments of the present disclosure relate to a secondary battery capable of preventing an electrode assembly from moving inside a case.

2. Description of the Related Art

A secondary battery includes an electrode assembly having a positive electrode, a negative electrode, and a separator interposed between the positive electrode and the negative electrode, a case having a side open to accommodate the electrode assembly together with an electrolyte, and a cap assembly that seals the open side of the case. The cap assembly of a secondary battery includes a positive electrode terminal and a negative electrode terminal that are electrically connected to the positive and negative electrodes of the electrode assembly.

In general, a gap exists between the case and the electrode assembly to insert the electrode assembly into the case. Due to this, there may be a problem that the electrode assembly moves without being fixed inside the case due to the gap after the electrode assembly is inserted into the case.

The above information disclosed in this Background section is provided for enhancement of understanding of the background of the invention and, therefore, it may contain information that does not constitute prior art.

SUMMARY

According to an aspect of embodiments of the present disclosure, a secondary battery is provided in which an elastically recoverable retainer is interposed between an electrode assembly and a case to prevent (prevent or substantially prevent) the electrode assembly from moving inside the case.

According to one or more embodiments, a secondary battery includes: an electrode assembly including a negative electrode tab at a first end and a positive electrode tab at a second end; a case including a pair of first side portions facing each of a pair of long side portions of the electrode assembly, and a pair of second side portions facing each of a pair of short side portions of the electrode assembly, the case being open in directions of the negative electrode tab and the positive electrode tab; and a retainer between at least one of the second side portions and the electrode assembly and including a concave-convex structure.

The negative electrode tab and the positive electrode tab may be respectively located at opposite ends of the electrode assembly in a longitudinal direction.

The retainer may include a leaf spring.

The retainer may include an insulating material.

A width of the retainer may be less than a width of the short side portions.

The electrode assembly may include a negative electrode plate, a separator, and a positive electrode plate that are stacked or wound.

The secondary battery may further include a pair of cap assemblies respectively coupled to open ends of the case.

The retainer may be provided as a pair respectively located between each of the second side portions and the electrode assembly.

The retainer may be elastically restored after being inserted into the case in a compressed state.

The secondary battery may further include a cap assembly of a negative electrode side, which is coupled to a first open side of the case and is electrically connected to the negative electrode tab; and a cap assembly of a positive electrode side, which is coupled to a second open side of the case and is electrically connected to the positive electrode tab.

DETAILED DESCRIPTION

Figure 1:
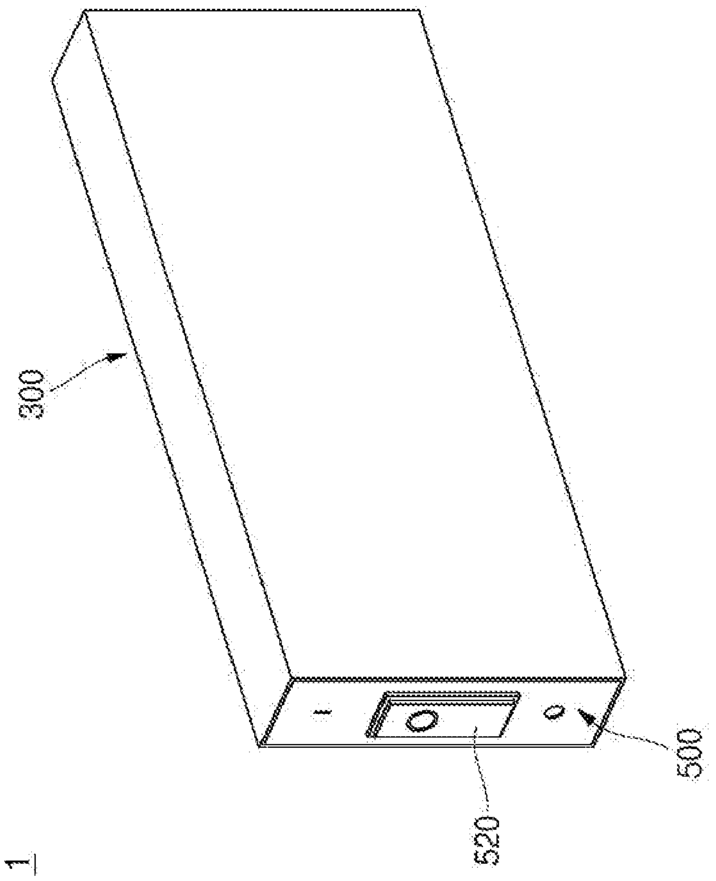
FIG. 1 is a perspective view illustrating a secondary battery according to an embodiment of the present disclosure.

Some embodiments of the present disclosure are provided to more completely explain the present disclosure; however, the present disclosure may be embodied in many different forms and should not be construed as being limited to the embodiments set forth herein. Rather, these example embodiments are provided so that this disclosure will be thorough and complete and will convey aspects and features of the present disclosure to a person skilled in the art.

In addition, in the accompanying drawings, sizes or thicknesses of various components may be exaggerated for brevity and clarity. Like numbers refer to like elements throughout. As used herein, the term "and/or" includes any and all combinations of one or more of the associated listed items. In addition, it is to be understood that when an element A is referred to as being "connected to" an element B, the element A may be directly connected to the element B or one or more intervening elements C may be present therebetween such that the element A and the element B are indirectly connected to each other.

The terminology used herein is for the purpose of describing particular embodiments and is not intended to be limiting of the disclosure. As used herein, the singular forms are intended to include the plural forms as well, unless the context clearly indicates otherwise. It is to be further understood that the terms "comprise" or "include" and/or "comprising" or "including," when used in this specification, specify the presence of stated features, numbers, steps, operations, elements, and/or components, but do not preclude the presence or addition of one or more other features, numbers, steps, operations, elements, components, and/or groups thereof.

It is to be understood that, although the terms "first," "second," etc. may be used herein to describe various members, elements, regions, layers, and/or sections, these members, elements, regions, layers, and/or sections should not be limited by these terms. These terms are used to distinguish one member, element, region, layer, and/or section from another. Thus, for example, a first member, a first element, a first region, a first layer, and/or a first section discussed below could be termed a second member, a second element, a second region, a second layer, and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It is to be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the example term "below" can encompass both an orientation of above and below.

Unless otherwise defined, all terms (including technical and scientific terms) used herein have the same meaning as commonly understood by one of ordinary skill in the art to which the inventive concept pertains. It is also to be understood that terms defined in commonly used dictionaries should be interpreted as having meanings consistent with the meanings in the context of the related art, and are expressly defined herein unless they are interpreted in an ideal or overly formal sense.

Herein, a secondary battery according to an embodiment of the present invention will be described in further detail with reference to the accompanying drawings.

Figure 2:
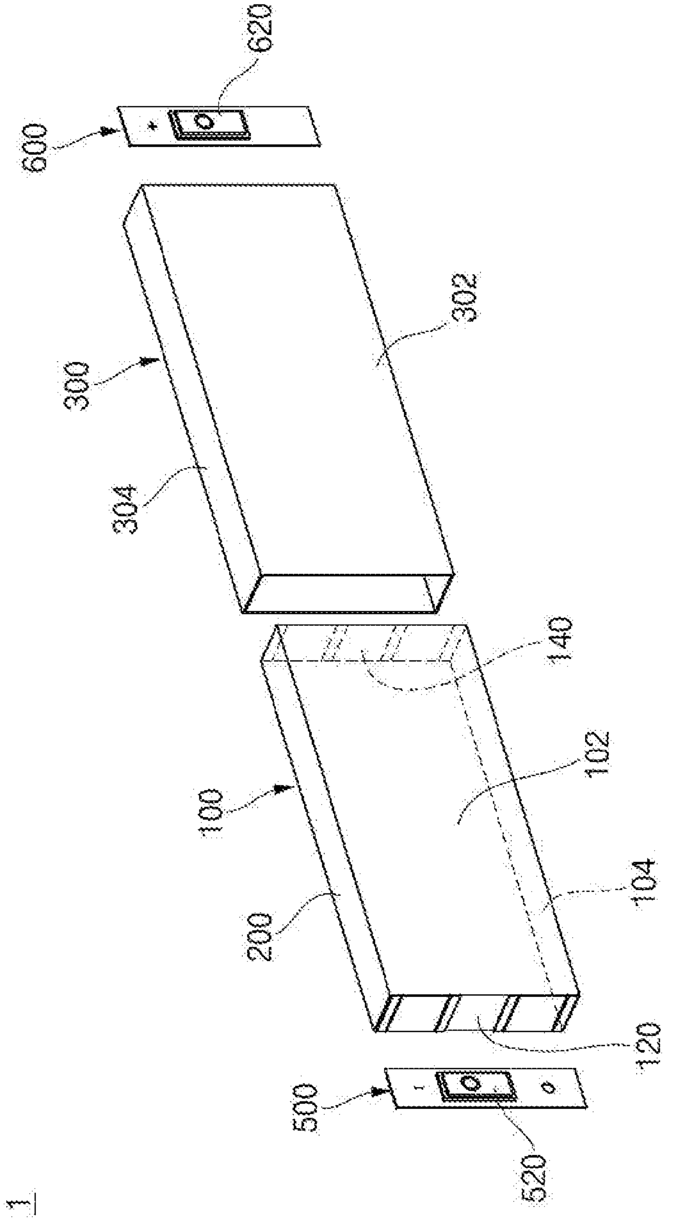
FIG. 2 is an exploded perspective view of the secondary battery of FIG. 1.

As shown in FIGS. 1 and 2, a secondary battery 1 according to an embodiment of the present disclosure may include an electrode assembly 100, a case 300, and a pair of cap assemblies 500 and 600.

The electrode assembly 100 is accommodated in the case 300 having open opposite ends facing away from each other, and the cap assemblies 500 and 600 are coupled to each of the open opposite ends of the case 300 to seal the case 300. The electrode assembly 100 is accommodated in the case 300 together with an electrolyte.

The electrode assembly 100 may be formed by stacking or winding a negative electrode plate, a separator, and a positive electrode plate formed in a thin plate shape or a film shape.

The negative electrode plate may be formed by coating a negative electrode active material, such as graphite or carbon, on a negative electrode substrate formed of a metal foil, such as copper, a copper alloy, nickel, or a nickel alloy. A negative electrode uncoated portion to which the anode active material is not applied may be formed in a region of the negative electrode substrate, and a negative electrode tab 120 is formed on the negative electrode uncoated portion. The negative electrode tab 120 may be formed to face a first side along a longitudinal direction of the electrode assembly 100.

The positive electrode plate may be formed by coating a positive electrode active material, such as a transition metal oxide, on a positive electrode substrate formed of a metal foil, such as aluminum or an aluminum alloy. A positive electrode uncoated portion to which a positive electrode active material is not applied may be formed in a region of the positive electrode substrate, and a positive electrode tab 140 is formed on the positive electrode uncoated portion. The positive electrode tab 140 may be formed to face a second side along the longitudinal direction of the electrode assembly 100. That is, the negative electrode tab 120 and the positive electrode tab 140 are respectively formed at opposite ends to face opposite directions along the longitudinal direction of the electrode assembly 100.

The separator is disposed between the negative electrode plate and the positive electrode plate to prevent or substantially prevent a short circuit and enables the movement of lithium ions. The separator may be made of, but is not limited to, polyethylene, polypropylene, a composite film of polyethylene and polypropylene, or the like.

The case 300 may be formed of a conductive metal, such as aluminum, an aluminum alloy, or nickel-plated steel. For example, the case 300 may have a rectangular parallelepiped shape, and opposite ends thereof in the longitudinal direction are open. In an embodiment, the case 300 includes a pair of first side portions 302 disposed to face each of a pair of long side portions 102 of the electrode assembly 100, and a pair of second side portions 304 disposed to face each of a pair of short side portions 104 of the electrode assembly 100, and is open in the respective directions of the negative electrode tab 120 and the positive electrode tab 140.

The cap assembly 500 of a negative electrode side is coupled to a first end of the case 300 and includes a negative terminal 520 electrically connected to the negative electrode tab 120. The cap assembly 600 of a positive electrode side is coupled to a second end of the case 300 and includes a positive electrode terminal 620 electrically connected to the positive electrode tab 140.

As such, since the negative electrode tab 120 and the positive electrode tab 140 are formed at opposite ends in the longitudinal direction of the electrode assembly 100, the sizes of current-collecting components can be reduced, compared to a structure in which the negative electrode tab 120 and the positive electrode tab 140 are disposed at one side, that is, a same side, thereby improving space utilization. In an embodiment, the negative electrode tab 120 and the positive electrode tab 140 are horizontally disposed at both ends, that is, opposite ends, of the electrode assembly 100 in the longitudinal direction, and a charging/discharging current flows in the horizontal direction, thereby reducing battery deterioration.

Figure 3:
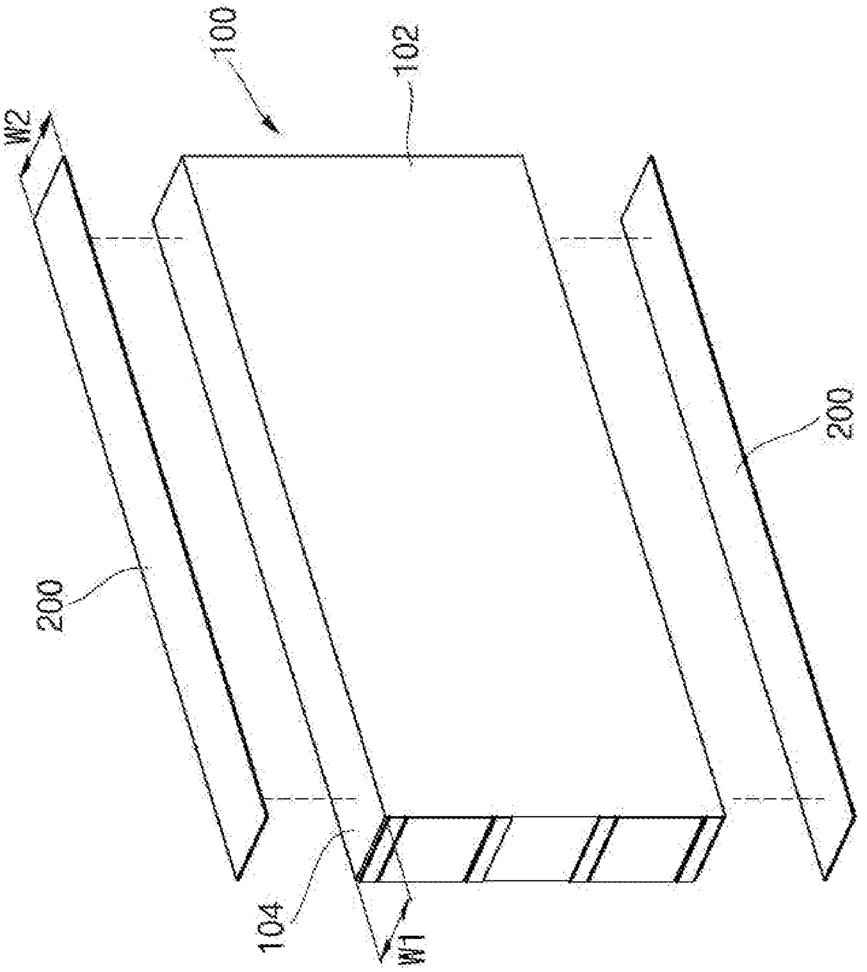
FIG. 3 is a perspective view illustrating a pair of retainers separated from an electrode assembly of a secondary battery, according to an embodiment of the present disclosure.
Figure 4:
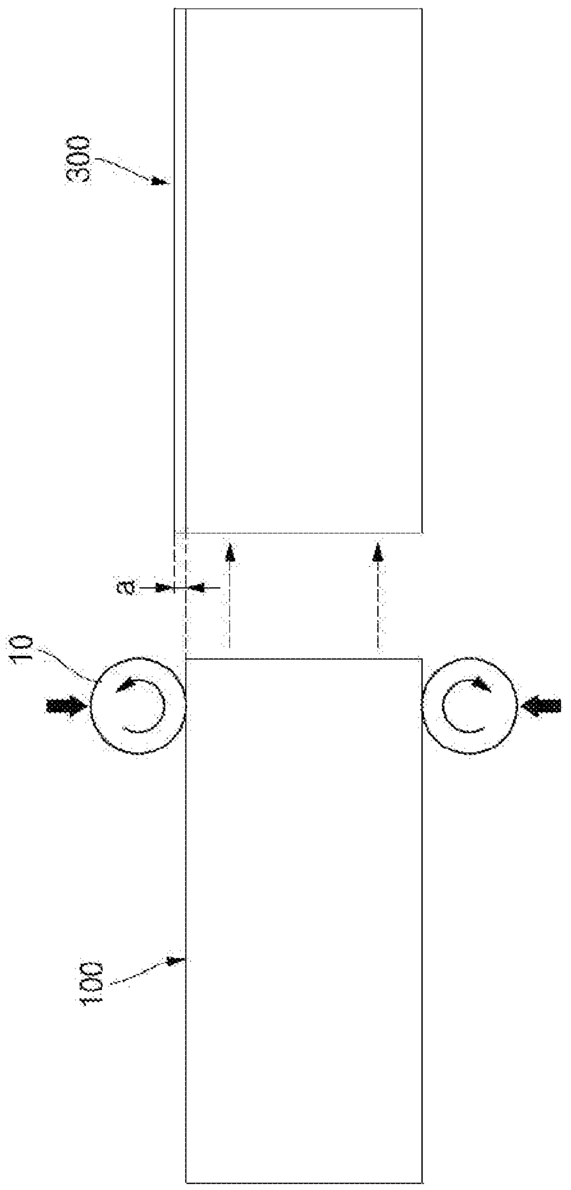
FIG. 4 is a front view illustrating a process in which an electrode assembly to which a pair of retainers is attached is assembled inside a case, according to an embodiment of the present disclosure.
Figure 5:
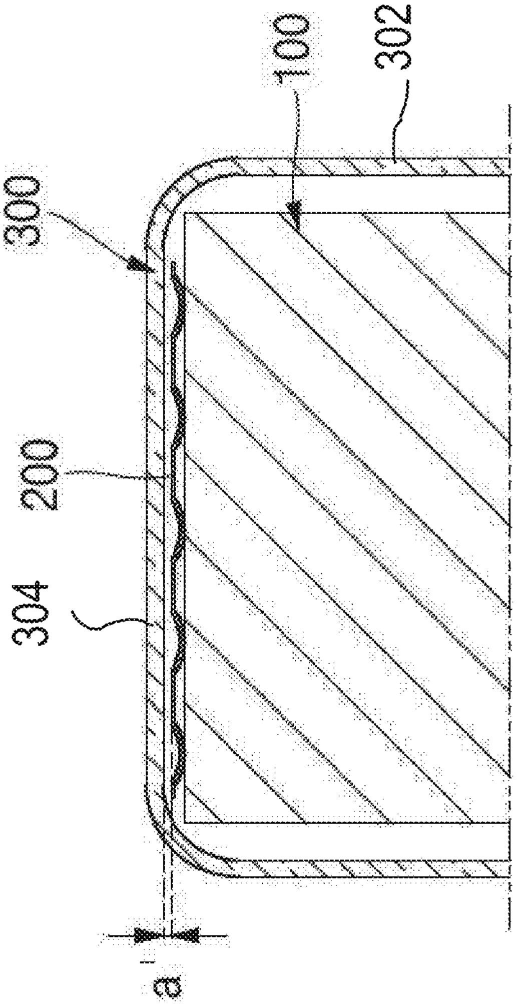
FIG. 5 is a cross-sectional view illustrating a state in which a retainer is interposed between an electrode assembly and a case after the electrode assembly is assembled into the case, according to an embodiment of the present disclosure.

In embodiments of the present disclosure, as shown in FIGS. 3 to 5, a retainer 200 may be interposed to prevent (prevent or substantially prevent) the electrode assembly 100 from moving inside the case 300. In an embodiment, a pair of elastically recoverable retainers 200 are respectively inserted between the pair of short side portions 104 of the electrode assembly 100 and the pair of second side portions 304 of the case 300.

In an embodiment, the pair of retainers 200 may be formed of leaf springs having a concave-convex structure. In an embodiment, for example, the concave-convex structure may have a shape in which an upwardly convex structure and a downwardly concave structure are alternately arranged from a centerline based on a virtual horizontal centerline. The upwardly convex structure and the downwardly concave structure may have a cross-sectional shape, such as a semicircular shape, a quadrangular shape, or a polygonal shape. In another embodiment, an upward convex structure and a flat structure, or a downwardly concave structure and a flat structure, may be alternately arranged with respect to the centerline. FIG. 5 illustrates a configuration in which a downwardly concave structure and a flat structure are alternately arranged. In an embodiment, the pair of retainers 200 are made of an insulating material, and a short circuit between the negative electrode plate and the positive electrode plate of the electrode assembly 100 can be prevented (prevented or substantially prevented).

As shown in FIG. 3, the pair of retainers 200 may be attached to the pair of short side portions 104 of the electrode assembly 100. In an embodiment, when the electrode assembly 100 to which the pair of retainers 200 is attached is inserted into the case 300, the pair of retainers 200 may be compressed by a roller 10, as shown in FIG. 4. Therefore, in a state in which a gap is secured between the electrode assembly 100 to which the pair of retainers 200 is attached and an inner surface of the case 300, the electrode assembly 100 may be easily inserted into the case 300. In FIG. 4, the gap between the electrode assembly 100 and the inner surface of the case 300 is indicated as "a."

In an embodiment, a width W2 of the pair of retainers 200 is smaller than a width W1 of the pair of short side portions 104 of the electrode assembly 100 (W1>W2), such that the pair of retainers 200 may be easily inserted into the case 300.

After the electrode assembly 100 is inserted into the case 300, the pair of retainers 200 may be interposed between the pair of short side portions 104 of the electrode assembly 100 and the pair of second side portions 304 of the case 300 in an elastically restored state. Accordingly, a gap between the electrode assembly 100 and the case 300 is reduced, thereby preventing (preventing or substantially preventing) the electrode assembly 100 from moving inside the case 300. In FIG. 5, the gap reduced by the retainers 200 is indicated as "a'."

As described above, according to embodiments of the present disclosure, the elastically recoverable retainers 200 are interposed between the electrode assembly 100 and the case 300, and, thus, the gap between the electrode assembly 100 and the case 300 after assembling may be reduced, thereby preventing (preventing or substantially preventing) the electrode assembly 100 from moving inside the case 300.

In addition, in an embodiment, the electrode assembly 100 is inserted into the case 300 in a state in which the retainers 200 are attached to the pair of short side portions 104 of the electrode assembly 100 and then compressed, thereby preventing or substantially preventing the electrode assembly 100 from being damaged due to scratching during insertion.

According to embodiments of the present disclosure, by interposing an elastically recoverable retainer between an electrode assembly and a case, the electrode assembly can be prevented (prevented or substantially prevented) from moving inside the case.

In addition, by attaching a retainer to a pair of short side portions of an electrode assembly and inserting the electrode assembly into a case in a compressed state, the electrode assembly can be prevented (prevented or substantially prevented) from being damaged due to scratching during insertion.

While one or more embodiments have been described for carrying out the present disclosure, the present disclosure is not limited to the described embodiments, and it will be understood by a person skilled in the art that various changes in form and details may be made therein without departing from the spirit and scope of the present disclosure as set forth by the following claims.

What is claimed is:

1. A secondary battery comprising:

an electrode assembly comprising a negative electrode tab at a first end and a positive electrode tab at a second end opposite the first end along a first direction;

a case comprising a pair of first side portions facing each of a pair of long side portions of the electrode assembly, and a pair of second side portions facing each of a pair of short side portions of the electrode assembly, opposite ends of the case being open in the first direction and a direction opposite the first direction, respectively;

a negative terminal electrically connected to the negative electrode tab, and a positive terminal electrically connected to the positive electrode tab, the positive terminal and the negative terminal extending outside the case in the first direction and the direction opposite the first direction, respectively, at the opposite ends of the case; and a retainer between at least one of the second side portions and the electrode assembly with a gap between the retainer and the at least one of the second side portions, the retainer spaced apart from at least one of the first side portions and comprising a concave-convex structure, wherein the retainer comprises an insulating material.

2. The secondary battery of claim 1, wherein the negative electrode tab and the positive electrode tab are respectively located at opposite ends of the electrode assembly in a longitudinal direction.

3. The secondary battery of claim 1, wherein the retainer comprises a leaf spring.

4. The secondary battery of claim 1, wherein a width of the retainer is less than a width of the short side portions.

5. The secondary battery of claim 1, wherein the electrode assembly comprises a negative electrode plate, a separator, and a positive electrode plate that are stacked or wound.

6. The secondary battery of claim 1, further comprising a pair of cap assemblies respectively coupled to open ends of the case.

7. The secondary battery of claim 1, wherein the retainer is provided as a pair respectively located between each of the second side portions and the electrode assembly.

8. The secondary battery of claim 1, wherein the retainer is elastically restored after being inserted into the case in a compressed state.

9. The secondary battery of claim 1, further comprising:

a cap assembly of a negative electrode side, which is coupled to a first open side of the case and is electrically connected to the negative electrode tab; and a cap assembly of a positive electrode side, which is coupled to a second open side of the case and is electrically connected to the positive electrode tab.

10. The secondary battery of claim 1, wherein the concave-convex structure comprises convex structures and concave structures, convex structures and flat structures, or concave structures and flat structures alternately arranged along a direction transverse to the first direction.

* * * * *